(12) United States Patent
Kulkarni et al.

(10) Patent No.: US 7,041,762 B2
(45) Date of Patent: May 9, 2006

(54) POLYVALENT IMPRINTED POLYMER AND PROCESS OF PREPARATION THEREOF

(75) Inventors: Mohan Gopalkrishna Kulkarni, Maharashtra (IN); Jayant Jagannath Khandare, Maharashtra (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/402,142

(22) Filed: Mar. 31, 2003

(65) Prior Publication Data
US 2004/0192869 A1 Sep. 30, 2004

(51) Int. Cl.
*C08F 218/00* (2006.01)

(52) U.S. Cl. .............. 526/307.7; 526/217; 526/219.6; 526/234; 526/264; 526/288; 526/291; 526/303.1; 526/304; 526/307.3; 526/317.1; 526/328.5; 526/347.1

(58) Field of Classification Search ............. 526/307.7, 526/217, 219.6, 234, 264, 288, 291, 303.1, 526/304, 307.3, 317.1, 328.5, 347.1
See application file for complete search history.

(56) References Cited

U.S. PATENT DOCUMENTS

| | | | |
|---|---|---|---|
| 5,891,862 A * | 4/1999 | Mandeville et al. ........... 514/54 |
| 5,959,050 A * | 9/1999 | Mosbach et al. ............. 526/201 |
| 6,379,599 B1 * | 4/2002 | Vaidya et al. ................ 264/220 |
| 6,420,487 B1 * | 7/2002 | Vaidya et al. ............. 525/326.9 |
| 6,689,836 B1 * | 2/2004 | Vaidya et al. ............... 525/54.1 |
| 6,822,064 B1 * | 11/2004 | Kulkarni et al. ......... 526/328.5 |
| 6,825,308 B1 * | 11/2004 | Kulkarni et al. ......... 526/307.7 |
| 2003/0027959 A1 * | 2/2003 | Vaidya et al. .......... 526/238.23 |
| 2004/0192905 A1 * | 9/2004 | Kulkarni et al. ............... 536/53 |

* cited by examiner

*Primary Examiner*—Helen L. Pezzuto
(74) *Attorney, Agent, or Firm*—Nixon & Vanderhye, PC

(57) ABSTRACT

The present invention relates to a polyvalent imprinted polymer useful in medicine and biotechnology and to a process for the preparation thereof. More particularly it relates to the said polymer of formula (1) herein below

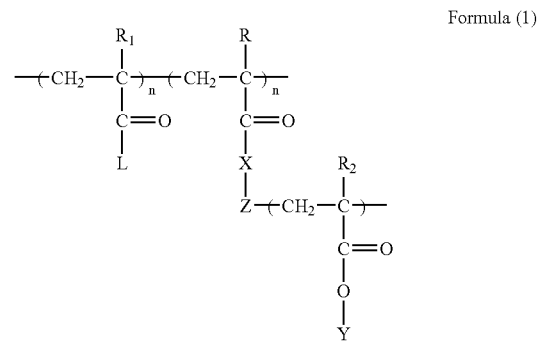

Formula (1)

wherein R is H, $CH_3$, $C_2H_5$, $C_6H_5$, $R_1$ is H, $CH_3$, $C_2H_5$, $C_6H_5$; $R_2$ is H, $CH_3$, $C_2H_5$, $C_6H_5$, X is based on 4-Amino Butyric Acid (4-ABa), 6-Amino Caproic Acid (6-ACA), 8-Amino Octanoic Acid (8-AOA), 10-Amino Decanoic Acid (10-ADA), 11-Amino Undecanoic Acid (11-ADA), n is from 3 to 50, L is OH, $NH_2$, $OCH_3$, $NH-CH-(CH_3)_2$, Cl, $OCH_2$, $CH=CH_2$, $O-CH=CH_2$; and Y is N-Acetyl Glucosamine (NAG), mannose, galactose, sialic acid, fructose, ribulose, erythrolose, xylulose, psicose, sorbose tagaose, glucopyranose, fructofuranose, deoxyribose, galactosamine, sucrose, lactose, isomaltose, maltose, cellobiose, cellulose and amylose; Z is based on chain terminating agent such as Mercapto Ethanol, Mercapto, Mercapto Propanol, Mercaptoethylamine HCl.

22 Claims, No Drawings

POLYVALENT IMPRINTED POLYMER AND PROCESS OF PREPARATION THEREOF

FIELD OF THE INVENTION

The present invention relates to a polyvalent imprinted polymer useful in medicine and biotechnology and to a process for the preparation thereof. More particularly it relates to the said polymer of formula (1) herein below

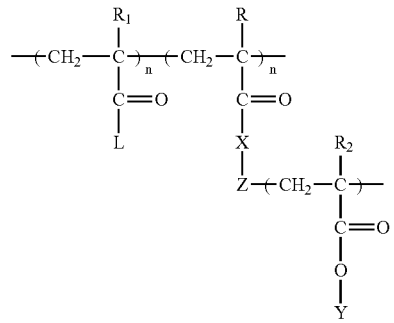

Formula (1)

wherein R is H, $CH_3$, $C_2H_5$, $C_6H_5$, $R_1$ is H, $CH_3$, $C_2H_5$, $C_6H_5$; $R_2$ is H, $CH_3$, $C_2H_5$, $C_6H_5$, X is based on 4-Amino Butyric Acid (4-ABa), 6-Amino Caproic Acid (6-ACA), 8-Amino Octanoic Acid (8-AOA), 10-Amino Decanoic Acid (10-ADA), 11-Amino Undecanoic Acid (11-ADA), n is from 3 to 50, L is OH, $NH_2$, $OCH_3$, $NH-CH-(CH_3)_2$, Cl, $OCH_2$, $CH=CH_2$, $O-CH=CH_2$; and Y is N-Acetyl Glucosamine (NAG), mannose, galatose, sialic acid, fructose, ribulose, erythrolose, xylulose, psicose, sorbose tagaose, glucopyranose, fructofuranose, deoxyribose, galactosamine, sucrose, lactose, isomaltose, maltose, cellobiose, cellulose and amylose; Z is based on chain terminating agent such as Mercapto Ethanol, Mercapto, Mercapto Propanol, Mercaptoethylamine HCl.

Still more particularly it relates to the said polyvalent imprinted copolymers containing carbohydrate ligand N-Aceyl Glucosamine (NAG) and preparation thereof. Still more particularly it relates to polyvalent imprinted polymers prepared in the presence of lysozyme having sites designated A–F with a molecular weight of 14000–15000 as a template. Thus, such imprinted polyvalent copolymers bind more strongly to lysozyme than polymers of the same composition prepared in the absence of lysozyme. The process of the invention comprises reacting monomer of formuula (2) herein below (R═H for Acryloyl Chloride and R═$CH_3$ in case of Methacryloyl Chloride)

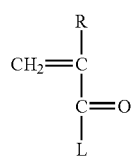

Formula (2)

wherein, R is H, $CH_3$, $C_2H_5$, CH and L is OH, $NH_2$, $OCH_3$, $NH-CH-(CH_3)_2$, Cl, $OCH_2CH=CH_2$, $O-CH=CH_2$ with a polymerizable macromer of formula (3)

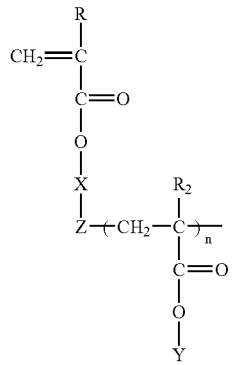

Formula 3 wherein, R is H, $CH_3$, $C_2H_5$, $C_6H_5$, $R_2$ is H, $CH_3$, $C_2H_5$, $C_6H_5$, X, IS 4-Amino Butyric Acid (4-ABA), 6-Amino Caproic Acid (6-ACA), 8-Amino Octanoic Acid (8-AOA), 10-Amino Decanoic Acid (10-ADA), 11-Amino Undecanoic Acid (11-ADA), n is from 3 o 500, Z is chain terminating agent such as Mercapto Ethanol, Mercapto Propanol and Mercaptoethylamine HCl; Y is N-Acetyl Glucosamine (NAG), mannose, galatose, sialic acid, fructose, ribulose, erythrolose, xylulose, psicose, sorbose, tagatose, glucopyranose, fructofuranose, deoxyribose, galactosamine, sucrose, lactose, isomaltose, maltose, celloboise, cellulose and amylose.

The polyvalent imprinted copolymers provided by the present invention are useful for inhibition of viral infections and the recoveries of biomolecules, The method of synthesis of polyvalent imprinted copolymers is demonstrated in this specification using lysozyme as a biomolecule and N-acetyl glucosamine as a ligand.

BACKGROUND OF THE INVENTION

Design of a host specific molecule using molecular imprinting technique has been investigated since long time. Molecular imprinting methodology finds applications in bioseparation, enzyme mimics, chiral separations and antibody mimics. The technique creates selective binding sites in synthetic polymers (Mosbach, K., et al. TIBS, 19, 9–14, 1994).

The technique involves the polymerization of functional monomers in the presence of a template molecule. In the past various approaches such as covalent and non covalent interactions have been used to synthesize imprinted polymers (Kempe, M., Mosbach, K., Journal of Chromatography A, 694, 3–13, 1995). The template molecule binds to the active sites on the polymer via non covalent interactions such as ionic, hydrophobic or hydrogen bonding. Shea: K. J (TRIP, 5, 166–173, 1994) described the de novo synthesis of macromolecular binding and catalytic sites. Functional groups on macromolecular chains were bound non-covalently to polymerizable ligands which were then copolymerized with excess of cross linkers in the presence of macromolecular template.

Protein carbohydrate interactions are of low affinity. If relative density and spatial arrangement of ligands incorporated is optimized, then the binding between the substrates and the ligand can be substantially enhanced. The enhanced interactions are also desirable in affinity separations, drug delivery and biotechnology. Design of high affinity protein carbohydrate binding systems can provide an alternative strategy for the treatment of infectious diseases e.g. influenza and rotavirus. This has the advantage; as such agents will not result in pathogen resistance to antibiotics and drugs. A new approach to treat influenza is based on the principle of inhibition of virus binding on to the host cells. The inhibitors like sialic acid anchored to polymeric or liposomal carriers have been reported in the past.

Since monovalent interactions of natural oligosaccharides are weak, they need to be used in large quantities for an effective treatment. To overcome this problem polyvalent carbohydrate molecules can be synthesized (Zopf, D., Roth, S. Lancet 347, 1017, 1996). The concept of using polyvalent carbohydrate moieties is attractive since it provides a nontoxic therapeutic molecule to a wide range of human diseases. But synthesis of such compounds is critical and requires knowledge of the host-cell binding mechanism. So far molecular imprinting technique has been exploited for chiral separation. This involves interactions of polymerizable functional monomers around an imprinted molecule. Template molecule is then leached which leaves functional groups in the polymers at sites complementary to the template used during the synthesis. Shi H.; Tsai W. B.; Garrison M. D.; Ferrari S.; Ratner, B. D. (Nature, 398: 6728, 593–597, 1999) reported template-imprinted nanostructured surfaces for protein recognition. The investigators used radio-frequency glow-discharge plasma deposition to form polymeric thin films around proteins coated with disaccharide molecules. The disaccharides become covalently attached to the polymer film, creating polysaccharide-like environment around the template that exhibits highly selective recognition for the templated proteins, including albumin, immunoglobulin G, lysozyme, ribonuclease and "streptavidin. Direct imaging of template recognition is achieved by patterning a surface at the micrometer scale with imprinted regions.

Molecularly imprinted polymers can be used as specialty substrates for the separation of various biomolecules, The patent granted to our group (Vaidya; A. A,; Lele; B. S., Kulkarni; M. G; Mashelkar, R. A, U.S. Pat. No. 6,379,599, 2002) describes the process for preparation of molecularly imprinted polymers useful for separation of enzymes. The invention describes polymerization of complex comprising enzyme and affinity monomer, a comonomer and a crosslinker.

The molecularly imprinted polymers synthesized in the presence of biomolecules as templates impart the advantages of higher affinity and selectivity. Imprinted polymers in general display good recognition properties and are usually prepared in non-polar organic solvents such as chloroform or toluene. Biological recognition mainly occurs in hydrophilic environment and therefore it is important to synthesize MIPs containing ligands capable of interactions with a receptor molecule in the aqueous medium.

However, preparation of imprinted polymers in aqueous system has proven to be a difficult task, since the water molecule can destroy the hydrogen-bonding interactions between functional monomer and the template molecule. Moreover, commonly used cross-linkers do not dissolve in water.

Takeuchia, T.; Kugimiyaa A.; and Matsuia, J. (Materials Science and Engineering: C, 4: 4, 263–266, 1997) reported sialic acid-imprinted polymers using noncovalent interactions. Mosbach, Klaus; Mayes; Andrew G. (U.S. Pat. No. 5,959,050, 1999) reported molecularly imprinted polymer supports and their preparation via suspension polymerization. The suspension techniques according to the said invention provide molecularly imprinted polymers using a perfluorocarbon liquid containing polyoxyethylene ester groups as the dispersing phase. Most of the methods reported in the past utilize organic solvents for molecular imprinting.

Biomolecules such as enzymes and proteins are thermolabile and may undergo structural changes under the experimental conditions used for polymerization in the presence of these templates and lose their biological activity. Moreover, choice of such biomolecules as templates in organic solvents may alter their conformation and lead to loss of specificity.

Thus there is a necessity to synthesize imprinted polymers in which biomolecules will be solvent compatible, stable and hence can find wide range of applications such as biomolecular recoveries and medicine.

Site-specific interactions of ligand and the receptor are useful in immunoassays and biomolecule separations. The interacting molecules can be proteins or peptides, antibodies, enzymes, polysaccharides or glycoproteins that specifically bind to other substrate receptors in the suitable environment. A ligand so bound can be displaced from the binding site by altering environmental conditions.

Recent advancements in the field of glycoscience have demonstrated enhanced binding between carbohydrate ligands and specific receptors as a result of the polyvalency or cluster effect. Moreover, polyvalent materials also contribute to steric stabilization.

Literature highlights the advantages of polyvalent interactions and their application in medicine and biotechnology. The sialic acid moieties can be linked to polymer for the treatment of rotavirus (Mandeville, III, et al., U.S. Pat. No. 6,187,762, 2001). These moieties can inhibit or prevent rotavirus infection in mammals and humans.

Mammen, et al., (J. Med. Chem., 38, 4179–4190, 1995) reported polyacrylamides bearing pendent alpha sialoside groups as efficient inhibitors in agglutination of erythrocytes by influenza virus, suggesting the role of polyvalency. The affinity of the polyvalent inhibitor towards the surface of the virus is greatly enhanced compared to the monovalent sialic acid inhibitor. In addition high molecular weight polymers containing ligands inhibit binding between the virus and its receptor through steric exclusion.

Using controlled chemical synthesis methods such as molecular imprinting, it would be possible to control the spacing, steric accessibility, number of ligand molecules in the polymer. Moreover, molecular weight, density, solubility and physical structure of the imprinted polymeric conjugates can be man The synthesis of polyvalent copolymers by molecular imprinting technique can thus lead to unique advantages in various applications such as immunoassay, biomolecular recoveries and enhanced interactions.

Chitosan (Formula 4) is a linear, binary heteropolysaccharide consisting of 2-acetaamido-2-deoxy-β-D-glucose (GlcNAc; A-unit) and 2-amino-2-deoxy-D-glucose (GlcNAc, D-unit). The active site of lysozyme comprises subsites A–F. Specific binding of chitosan sequences to lysozyme begins with binding of the NAG Units in the subsite C. But, natural ligands derived from glucose are susceptible to microbial growth. Hence, there is a need to synthesize ligands similar to repeat units of chitosan, which will not be hydrolyzed by lysozyme. The polymers containing polyvalent NAG prepared using the imprinting technique reported here are expected to be more stable than chitin and chitosan.

Formula (4)

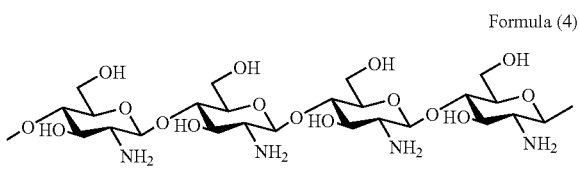

Apart from the interacting ligand, its distribution in the polymer chain also plays a crucial role in influencing the efficiency of the inhibition. The synthesis of polymers bearing tailored molecular structure prepared by molecular imprinting could be the most effective method for enhancing substrate ligand interactions.

Synthesis of polyvalent carbohydrate ligands by the polymerization of the corresponding monovalent ligands in the presence of biomolecules comprising multiple binding sites, so as to enhance the binding between the polyvalent ligand and the imprint molecule in a subsequent stage has not been reported in the past to our knowledge. The imprinting methodology leads to enhanced interactions between the polyvalent ligands and the substrate than the polyvalent ligands containing identical moles of ligand synthesized in the absence of the template.

Many approaches have been reported in the past for controlled synthesis of amphiphilic block copolymers bearing pendent N-Acetyl-D-Glucosamine residues by living cationic polymerization. The interaction of the diblock copolymers with lectins was reported by Yamada et al. (Macromolecules, 32, 3553–3558, 1999). This methodology of synthesizing homopolymers and the block copolymers containing N-Acetyl-D-Glucosamine residues demonstrates significant increase in binding affinity for lectin. The applicability of the method is however limited by the need for very low temperature al}d stringent polymerization conditions Further the experimental conditions preclude the use of a protein molecule as a template during synthesis.

In our copending applications filed on the same date, "Oligomers and Preparation Thereof"—application Ser. No. 10/402,256 and "Macromer and preparation thereof", application Ser. No. 10/812,838, we have claimed oligomers of NAG in which the NAG groups juxtaposed to one another, bind more effectively to lysozyme as reflected in values of binding constant (Kt,) and the inhibition concentrations ($I_{50}$).

In the conventional technique of free radical copolymerization the distribution of monomers along the polymer chain depends upon the values of the monomer reactivity ratios, which are determined primarily by the intrinsic structure of the monomer. Consequently the distribution of the NAG units in the copolymers comprising monomers bearing NAG cannot be tailored at will using conventional copolymerization techniques. To overcome this problem we have devised a macromer synthesis method to ensure that the copolymers prepared using conventional free radical polymerization technique will always contain sequences of NAG units in juxtaposition. (Our co pending application Polymerizable Macromer and synthesis thereof—application Ser. No. 10/402,256)

OBJECTS OF THE INVENTION

The main object of the present invention is to provide polyvalent polymers which comprise polyvalent ligands prepared by imprinting in the presence of lysozyme and therefore exhibit enhanced interactions.

It is another object of the invention to provide polyvalent imprinted polymers with appropriate molecular weight and which demonstrate greater efficiency in terms of enhanced binding and lower inhibition concentration for lysozyme.

It is yet another object of the invention to provide polyvalent imprinted polymers having greater water solubility, stability, and susceptibility to enzyme from hydrolysis.

It is a further object of the invention to provide a process for the preparation of polyvalent imprinted polymers containing polyvalent NAG which is simpler than the prior art methods by carrying out imprinting at lower temperatures in aqueous medium so that biomolecule retains its activity during imprinting.

It is another object of the invention to provide polyvalent imprinted polymers containing polyvalent NAG which are effective even at low ligand concentration than the polymers synthesized in the absence of a template.

It is a further object of the invention to provide polyvalent imprinted polymers which can form theromosensitive copolymers and can be used for recovery of the biomolecules

SUMMARY OF THE INVENTION

The present invention provides polyvalent polymers containing NAG macromer in the presence of a biomolecule and method of preparation thereof.

Accordingly the present invention provides an imprinted polyvalent polymer of formula (1)

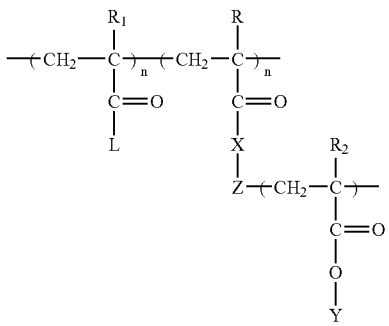

Formula 1 wherein, R is selected from H, CH$_3$, C$_2$H$_5$ and C$_6$H$_5$; R$_1$ is selected from H, CH$_3$, C$_2$H$_5$ and C$_6$H$_5$; R$_2$ is selected from H, CH$_3$, C$_2$H$_5$ and C$_6$H$_5$; X is based on the group selected from 4-Amino Butyric Acid (4-ABa), 6-Amino Caproic Acid (6-ACA), 8-Amino Octanoic Acid (8-AOA), 10-Amino Decanoic Acid (10-ADA) and 11-Amino Undecanoic Acid (11-ADA), n is from 3 to 50, L is selected from OH, NH$_2$, OCH$_3$, NH—CH—(CH$_3$)$_2$, Cl, OCH$_2$, CH═CH$_2$ and O—CH═CH$_2$; Y is selected from N-Acetyl Glucosamine (NAG), mannose, galactose, sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose; Z is based on chain terminating agent selected from Mercapto Ethanol, Mercapto Propanol, Mercaptoethylamine and HCl.

The present invention also provides a process for preparation of the polyvalent imprinted polymer of the formula 1

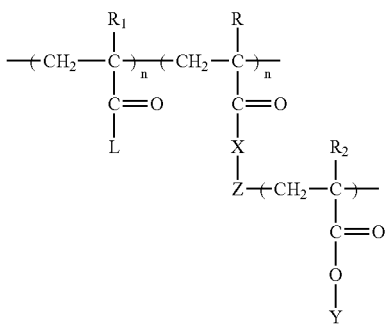

Formula 1 wherein, R is selected from H, CH$_3$, C$_2$H$_5$ and C$_6$H$_5$; R$_1$ is selected from H, CH$_3$, C$_2$H$_5$ and C$_6$H$_5$; R$_2$ is selected from H, CH$_3$, C$_2$H$_5$ and C$_6$H$_5$; X is based on the group selected from 4-Amino Butyric Acid (4-ABa), 6-Amino Caproic Acid (6-ACA), 8-Amino Octanoic Acid (8-AOA), 10-Amino Decanoic Acid (10-ADA) and 11-Amino Undecanoic Acid (11-ADA), n is from 3 to 50, L is selected from OH, NH$_2$, OCH$_3$, NH—CH—(CH$_3$)$_2$, Cl, OCH$_2$, CH═CH$_2$ and O—CH═CH$_2$; Y is selected from N-Acetyl Glucosamine (NAG), mannose, galactose, sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose; Z is based on chain terminating agent selected from Mercapto Ethanol, Mercapto Propanol, Mercaptoethylamine and HCl, said process comprising adding an affinity monomer of formula (2)

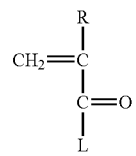

Formula 2 wherein, R is H, CH$_3$, C$_2$H$_5$, CH and L is OH, NH$_2$, OCH$_3$, NH—CH—(CH$_3$)$_2$, Cl, OCH$_2$CH═CH$_2$, O—CH═CH$_2$ to a solution containing a biomolecule having a molecular weight in the range of 14,000 to 15,000 and containing sites A–F in a solvent, incubating at room temperature to form a complex, dissolving a comonomer of formula (3) in the solution of biomolecules, Formula 3 wherein, R is H, CH$_3$, C$_2$H$_5$, C$_6$H$_5$, R$_2$ is H, CH$_3$, C$_2$H$_5$, C$_6$H$_5$, X, IS 4-Amino Butyric Acid (4-ABA), 6-Amino Caproic Acid (6-ACA), 8-Amino Octanoic Acid (8-AOA), 10-Amino Decanoic Acid (10-ADA), 11-Amino Undecanoic Acid (11-ADA), n is from 3 o 500, Z is chain terminating agent such as Mercapto Ethanol, Mercapto Propanol and Mercaptoethylamine HCl; Y is N-Acetyl Glucosamine (NAG), mannose, galatose, sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose, purging the solution with inert gas to obtain inert atmosphere, adding a polymerization initiator and a polymerization accelerator to the solution, heating the solution, separating the unreacted monomers and biomolecules by precipitating the polymer using a non solvent, drying under vacuum at room temperature to obtain the polyvalent imprinted polymer of formula 1.

In another embodiment of the invention, the biomolecule is selected from the group consisting of enzymes, proteins, bacteria and viruses.

In a further embodiment of the invention, the bacteria is selected from the group consisting of *E. coli, B. subtilis, S. aurius, micobacterium, sreptococci, pnemonococci*.

In yet another embodiment of the invention, the virus is selected from the group consisting of rotavirus, shiga, influenza, mumps and HIV.

In yet another embodiment of the invention, the enzyme is selected from the group consisting of lysozyme, trypsin, chymotrypsin, lipase, esterase, amylase, ovalbumin and bovine serum albumin.

In yet another embodiment of the invention, the biomolecule is a lectin comprising wheat germ agglutinin (WGA).

In another embodiment of the invention, the solvent is selected from water, Dimethyl formamide, Tetrahydrofuran, isobutanol, methanol, ethanol, ethyl acetate, 1,4 dioxane, and benzene.

In still another embodiment of the invention, the ratio of biomolecule to the affinity monomer is in the range of 10:1 to 1:10, preferably 1:1 (w/w).

In still another embodiment of the invention, the comonomer of formula 3 is selected from the group consisting of acrylic acid, methacrylic acid, methacryloyl chloride, acrylamide, N-isopropyl acrylamide (NIP A), 2-acrylamida-2 methyl propanesulphonic acid (AMPS), acryloyl chloride, acryloyl morpholin , vinyl pyrrolidone, styrene, allyl alcohol and allyl amine.

In yet another embodiment the amount of comonomer of formula 3 in the polymerization mixture is in the range of 5 to 80%, more particularly 45 to 55% by weight of the total feed.

In still another embodiment the polymerization initiator is selected from the group consisting of ammonium persulfate, ceric ammonium sulfate, potassium persulfate, and azobis isobutyro nitrile.

In yet another embodiment the polymerization initiator is present in an amount of 0.1% to 1% (w/w) of total feed.

In still another embodiment of the present invention the accelerator is selected from ethylene diamine and N,N,N,N-tetramethylethylenediamine.

In still another embodiment, the amount of polymerization accelerator is in the range of 1% to 4% by (w/w) of total feed.

In still another embodiment of the present invention the non-solvent used for precipitation of polyvalent imprinted polymer is selected from the group consisting of diethyl ether, acetone, hexane and hot water.

In yet another embodiment of the invention heating of the solution is carried out at a temperature in the range of 20° C. to 60° C.

DETAILED DESCRIPTION OF THE INVENTION

The present invention provides a process for the preparation of polyvalent copolymers useful for separation of enzymes.

Imprinted polymers contain polyvalent carbohydrate ligands for biomolecular target. These copolymers exhibit selective binding to the target enzyme/protein.

The present invention also provides a method for obtaining affinity ligand useful for isolating target biomolecule from a solution more efficiently. It is therefore advantageous to prepare polyvalent imprinted copolymers comprising covalently linked carbohydrate ligands such as NAG for enhanced binding with the receptor. Efficiency of binding can be quantified in terms of binding constants ($K_b$) and the relative inhibition ($I_{50}$).

Polymers comprising imprinted polyvalent ligands can further be used in the treatment of bacterial or viral infections for enhanced efficiency and are expected not to cause drug resistance. Monomers containing NAG may be used for copolymerization or oligomerization and exhibit enhanced hydrolytic stability and water solubility than natural polymers containing NAG such as chitosan.

They may be also used as anti-infective agents both for the prevention and treatment of diseases, recovery of the naturally occurring as well as genetically manipulated biomolecules. The molecular imprinting approach described for obtaining polyvalent ligand is a generic one and can be extended to other systems as well. For example sialic acid ligands are known to bind to influenza virus and rotavirus. Hence polymers comprising multiple sialic acid moieties will bind to viruses more strongly than the corresponding monomers. The approach described to prepare imprinted copolymers containing polyvalent NAG is simple and can be used to synthesize other ligands such as sialic acid which bind to influenza virus and rotavirus. Such polyvalent imprinted copolymers may be even used as anti-infective agents both for prevention and treatment of diseases. Moreover, polyvalent imprinted copolymers reported here are thermoprecipitating copolymers which can be used for recovery of biomolecules such as lysozyme and lectins.

The present invention provides a method for the preparation of polyvalent imprinted polymers demonstrated in the specification using lysozyme as a biomolecule and N-Acetyl Glucosamine as the ligand. Polyvalent imprinted copolymers exhibit enhanced interactions in terms of binding and inhibition of lysozyme as compared to non imprinted polymers containing NAG.

The enhanced efficacy results from the tailored arrangement of the interacting ligand for the receptive sites of the biomolecules. The present invention describes polyvalent imprinted polymers that exhibit stronger binding to template vis a vis polyvalent polymers of identical composition prepared in the absence of the corresponding template.

The term "copolymer" means any polymer prepared by using acrylic or methacrylic acid, acryloyl or methacryloyl chloride, glycidyl acrylate or methacrylate, glycerol acrylate or methacrylate, allyl chloride; hydroxy-lower-alkyl-acrylates, such as 2-hydroxyethyl methacrylate or 3-hydroxypropyl methacrylate, and amino-lower alkylacrylates, such as 2-amino-ethyl methacrylate with polymerizable polyvalent ligands containing NAG, sialic acid or mannose. Monomers, which are soluble in water or water/polar organic solvent mixtures, are particularly preferred.

The term "imprinted polyvalent ligand" means ligands such as N-Acetyl Glucosamine, mannose, galactose and sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose conjugated to a vinyl monomer and polymerized in the presence of a substrate such as an enzyme, protein, (bacteria, or a virus as a print molecule. Polyvalent ligands that are soluble in water or water/polar organic solvent mixtures are preferred.

The present invention provides imprinted polyvalent polymers having formula (1)

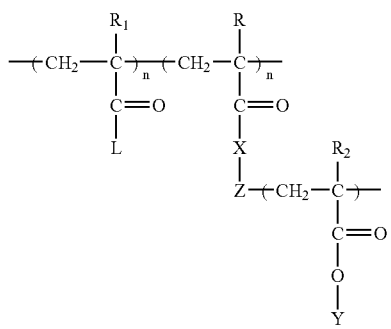

Formula 1 wherein, R is H, $CH_3$, $C_2H_5$, $C_6H_5$, $R_1$ is H, $CH_3$, $C_2H_5$, $C_6H_5$; $R_2$ is H, $CH_3$, $C_2H_5$, $C_6H_5$; X is based on 4-Amino Butyric Acid (4-ABa), 6-Amino Caproic Acid (6-ACA), 8-Amino Octanoic Acid (8-AOA), 10-Amino Decanoic Acid (10-ADA), 11-Amino Undecanoic Acid (11-ADA), n is from 3 to 50, L is OH, $NH_2$, $OCH_3$, $NH-CH-(CH_3)_2$, Cl, $OCH_2$, $CH=CH_2$, $O-CH=CH_2$; Y is N-Acetyl Glucosamine (NAG), mannose, galactose, sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose; Z is based on chain terminating agent such as Mercapto Ethanol, Mercapto Propanol, Mercaptoethylamine HCl.

The process of the invention comprises preparation of the polyvalent imprinted polymers mentioned above which comprises adding a monomer of formula (2) as given above to the solution containing biomolecule such as lysozyme having a molecular weight from 14,000 to 15,000 containing sites A–F in a solvent, incubating at room temperature to form the complex, dissolving a comonomer of formula (3) as given above in the solution of biomolecules, purging the solution with inert gas to obtain inert atmosphere, adding a polymerization initiator and a polymerization accelerator to the solution, heating the solution to a temperature of 20° C. to 60° C., separating the unreacted monomer and biomolecules by precipitating the polymer using a non solvent, drying under vacuum at room temperature to obtain the polyvalent imprinted polymer.

The affinity monomer contains N-Acetyl Glucosamine, sialic acid, galactose, mannose, galactose, sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose.

The biomolecules can be any of from enzymes, proteins, bacteria or viruses exemplified by bacteria like *E. coli, B, subtilis, S. aurius, micobacterium, sreptococci, pnemonococci*, etc; viruses like rotavirus, shiga, influenza, mumps, HIV etc.; enzymes like lysozyme, trypsin, chymotrypsin, lipase, esterase, amylase, ovalbumin, bovine serum albumin etc; lectins such as wheat germ agglutinin (WGA), etc. The solvent used is selected from water, Dimethyl formamide, Tetra hydro furan, isobutanol, methanol, ethanol, ethyl acetate, 1,4 dioxane, benzene etc. The ratio of biomolecule or/enzyme to affinity monomer may be in the range of 10:1 to 1:10, preferably 1:1 (w/w).

The comonomer can be acrylic acid, methacrylic acid, methacryloyl chloride, acrylamide, N-isopropyl acrylamide (NIP A), 2-acrylamida-2 methyl propanesulphonic acid (AMPS), acry{oyl chloride, acryloyl morpholin, vnyl pyrrolidone, styrene, allyl alcohol and allyl amine. The amount of comonomer in the the polymerization mixture is preferably in the range of 5 to 80%, more particularly 45 to 5501Q by weight of the total feed.

In still another embodiment the polymerization initiator is selected from the group consisting of ammonium persulfate, ceric ammonium sulfate, potassium persulfate, and azobis isobutyro nitrile, preferably in an amount of 0.1% to 1% (w/w) of total feed. The accelerator is ethylene diamine or N,N,N,N-tetramethylethylenediamine, preferably in an amount of polymerization accelerator may be 1% to 4% by (w/w) of total feed.

The non solvent used for precipitation of polyvalent imprinted polymer may b, diethyl ether, acetone, hexane and hot water.

In a feature of the present invention the polyvalent imprinted polymers containing ligand may be synthesized by a well-known art in the field, free radical polymerization. In one of the feature of the present invention polyvalent imprinted polymers containing ligand may be useful for applications in medicine and biotechnology.

In yet another feature of the present invention polyvalent imprinted polymers containing ligand for the interactions with biomolecules are more stable than the natural polymers such as chitin and chitosan containing N-Acetyl Glucosamine.

In yet another feature the polyvalent imprinted polymers containing ligand in the macromer polyvalent form are more efficient than NAG itself as evidenced by higher values of Kt, and lower values of $I_{50}$.

In yet another feature the polyvalent polymers containing the macromeric ligand prepared in the presence of the print biomolecules are more efficient than the polyvalent polymers containing the macromeric ligand prepared in the absence of the print biomolecules.

In another feature of the present invention the polyvalent imprinted polymers containing ligand reported here can bind simultaneously on to the multiple sites of the enzyme/ disease causing virus thereby enhancing the inhibitory effect.

In yet another feature of the present invention the polyvalent imprinted polymers containing ligand provide greater accessibility to the ligand conjugate for binding with receptor biomolecule.

In yet another feature of the present invention the efficiency of the relative inhibition may be expressed in terms of values $I_{50}$ mM and I max mM.

In yet another feature of the present invention polyvalent imprinted polymers containing ligand reported herein are effective at very low concentration, which is an advantage when the ligand under consideration is expensive e.g. sialic acid.

In yet another feature of the present invention polyvalent imprinted polymers containing NAG are stable, water soluble, resistant to degradation, and free from microbial contamination, which is an advantage over the natural polymers such as chitin and chitosan.

It is also expected that the presence of multiple ligands in the polymer backbone will enhance binding to the virus and biomolecules such as influenza virus, rotavirus, and wheat germ agglutinin. The polyvalent imprinted polymers containing ligand can potentially interact with multiple receptors simultaneously thereby enhancing the binding to the respective substrate.

The polyvalent imprinted polymers containing ligand reported by us are effective at very low concentration, which is a significant advantage when the ligands under consideration are expensive e.g. sialic acid. The process reported here for incorporation of polyvalent ligands into copolymers is relatively simple and involves fewer steps.

The ability of polyvalent imprinted polymers containing ligand to bind virus and biomolecules provides a means of developing new therapeutical agents. These polyvalent imprinted polymers can be used in various applications such as affinity separations and immunoassays.

It is expected that the presence of multiple ligands in the backbone can enhance binding to the viruses and biomolecules. Thus copolymers containing multiple ligands at low concentration are utilized and can potentially interact with multiple receptors thereby enhancing the inhibition.

Although the present invention describes a process for the preparation of molecularly imprinted polymers using lysozyme and the polyvalent ligand containing N-Acetyl Glucosamine the scope of the present invention is not and should not be construed to limit only to such molecularly imprinted polymers but it may extend to such combinations of affinity monomers and their respective biomolecules including bacteria and viruses.

It is however understood that other interacting ligands and the receptors which perform substantially the same function in the same or substantially the same manner to obtain the same or substantially the same results are intended to be within the scope of the present invention as defined by the present specification and claims.

The process for the preparation of the polyvalent imprinted polymers containing NAG is illustrated herein below with reference to examples, which are illustrative only and should not be considered to limit the scope of the present invention in any manner.

EXAMPLE 1

This example describes the process for the preparation of lysozyme imprinted polyvalent copolymers containing poly (acryloyl N-Acetyl Glucosamine)-6-(-N-acryloyl amino) caproate (Macromer). 50 mg of poly (acryloyl N-Acetyl Glucosamine)-6-(-N-acryloyl amino caproate) (Macromer) was dissolved in a two neck round bottom flask and 10 ml double distilled water was added. To the resulting solution 10 mg of lysozyme was added and solution was incubated for 15 min at room temperature to form lysozyme-Acryloyl 6-Amino Caproic Acid poly Acryloyl N-Acetyl Glucosamine complex. The comonomer 200 mg N-isopropylacrylamide (NIP A) and initiator ammonium persulfate 10 mg were added to above aqueous solution containing lysozyme-poly (acryloyl N-Acetyl Glucosamine)-6-(-N-acryloyl amino) caproate complex. The solution was purged with nitrogen gas for 15 min and 40 µl. tetramethylene ethylenediamine was added. The reaction was carried out at 37° C. for 4 hrs. The imprinted polyvalent copolymer was precipitated in diethyl ether and vacuum dried.

Imprinted polymers were also prepared by varying the extent of lysozyme inhibition from 20% to 100% by the addition of the corresponding amounts of the macromer. However in this example the ratio of macro mer to NIP A was aintained. (Table 1).

EXAMPLE 2

This example describes the process for the preparation of polyvalent imprinted polymers by inhibiting lysozyme completely using requisite moles of poly (acryloyl N-Acetyl Glucosamine)-6-(-N-acryloyl amino) caproate (Macromer) and by addition of varying amount of NIP A so as to vary polymer composition (Table 2). 50 mg of poly (acryloyl N-Acetyl Glucosamine)-6-(-N-acryloyl amino) caproate was dissolved in a two neck round bottom flask and 10 ml double distilled water was added. To the resulting solution 10 mg of lysozyme was added and solution was incubated for 15 min at room temperature to form lysozyme-poly (acryloyl N-Acetyl Glucosamine)-6-(-N-acryloyl amino) caproate complex. The comonomer 200 mg N-isopropylacrylamide (NIPA) and initiator ammonium persulfate 10 mg were added to above aqueous solution containing lysozyme-poly (acryloyl N-Acetyl Glucosamine)-6-(-N-acryloyl amino) caproate (Macromer) complex. The solution was purged with nitrogen gas for 15 min and 40 micro ml. tetramethylene ethylenediamine was added. The reaction was carried out at 37° C. for 4 hrs. The imprinted polyvalent copolymer was precipitated in diethyl ether and vacuum dried. The comonomer ratio of NIP A and macromer was varied from 1:4% to 4:1%

EXAMPLE 3

This example describes the process for the preparation of polyvalent copolymers containing poly Jacryloyl N-Acetyl Glucosamine)-6-(-N-acryloyl amino) caproate (Macromer) in the absence of the print biomolecule. 50 mg of poly (acryloyl N-Acetyl Glucosamine)-6-(-N-acfyloyl amino) caproate (Macromer) was dissolved in a two neck round bottom flask and 10 ml double distilled water added. The comonomer 200 mg isopropylacrylamide and initiator ammonium persulfate 10 mg was added to above aqueous solution containing poly (acryloyl N-Acetyl Glucosamine)-6-(-N-acryloyl amino) caproate. The solution was purged with nitrogen gas for 15 min and 40 fll. tetramethylene ethylenediamine was added. The reaction was carried out at 37° C. for 4 hrs. Polyvalent copolymer was precipitated in diethyl ether and vacuum dried

EXAMPLE 4

This example describes estimation of binding constant (Kb) of polyvalent copolymers comprising N-Acetyl Glucosamine and polyvalent copolymers alone by fluorescence spectrophotometric method. Fluorescence spectra of lysozyme were recorded on a Perkin Elmer LS-50 B luminescence spectrophotometer. Excitation frequency was 285 nm. Solutions of lysozyme and imprinted polyvalent copolymers containing N-Acetyl Glucosamine were prepared in 0.066 M phosphate buffer pH 6.2, containing 0.0154 M sodium chloride and 0.008 M sodium azide. 0.1 milliliter of lysozyme solution (80 µg/ml) was mixed with solution containing different ligand concentration in a 2 ml capacity 10 mm square quartz cells maintained at 18° C. Phosphate buffer was added to make the volume to 2 ml. The fluorescence intensities of the solutions were measured relative to the solutions containing enzymes and buffer-mixtures of the identical concentrations as reference. The relative fluorescence intensity of lysozyme saturated with solution containing different ligand concentration, Foe, was extrapolated from the experimental values by plotting 1/(Fo-F) against I/[S] where F is the measured fluorescence of a solution containing enzyme with given substrate concentration [S] and Fo is the fluorescence of a solution containing enzyme alone (Chipman et al., J. Biol. Chem., 242–19, 4388–4394, 1967). The highest concentration of polymer substrate used was such that enzyme was saturated more than 85%.

TABLE 1

Binding Constants (Kb) for imprinted copolymers of NIPA & poly(acryloyl N-Acetyl Glucosamine)-6-(-N-acryloyl amino) caproate (Macromer) by varying inhibition of lysozyme

| % Inhibition for Imprinting | % Moles NAG by NMR | $K_b M^{-1}$ |
|---|---|---|
| 100 | 30 | $1.25 \times 10^6$ |
| 80 | 28 | $3.57 \times 10^5$ |
| 60 | 21 | $8.7 \times 10^5$ |
| 40 | 24 | $3.01 \times 10^5$ |
| 20 | 18 | $2.17 \times 10^5$ |

The binding constant for imprinted copolymers of NIP A and Macromer are summarized in Table 1 wherein, imprinted copolymers containing 30% moles NAG has binding constant $1.26 \times 10^6 M{-}I$, which shows more then 40,000 folds enhancement over NAG ($K_b = 5.24 \times 10^2 M^{-1}$) and 30 folds over the copolymers containing 33% NAG but prepared in the absence of the lysozyme.

TABLE 2

Binding Constants (Kb) for Imprinted Copolymers with 100% lysozyme inhibition and NIP A dilution

| % Inhibition for Imprinting | % Moles NAG by NMR | Kb M -I |
|---|---|---|
| 100 | 69 | $3.90 \times 105$ |
| 100 | 62 | $3.38 \times 105$ |
| 100 | 2.4 | $5.00 \times 105$ |

TABLE 3

Binding Constants (Kb) for copolymers of NIPA & poly (acryloyl N-Acetyl Glucosamine)-6-(-N- acryloyl amino) caproate (Macromer) prepared in the absence of lysozyme

| % Moles NAG by NMR | $K_b M^{-1}$ |
|---|---|
| NAG | $5.24 \times 10^2$ |
| 40 | $5.08 \times 10^5$ |

TABLE 3-continued

Binding Constants (Kb) for copolymers of NIPA & poly (acryloyl N-Acetyl Glucosamine)-6-(-N- acryloyl amino) caproate (Macromer) prepared in the absence of lysozyme

| % Moles NAG by NMR | $K_b M^{-1}$ |
|---|---|
| 36 | $5.01 \times 10^5$ |
| 33 | $3.80 \times 10^5$ |
| 17 | $2.45 \times 10^5$ |

The binding constants for non imprinted copolymers of NIPA and Macromer are summarized in Table 3 wherein, non imprinted copolymer containing 17% mole NAG has binding constant $2.45 \times 105 M{-}I$, which shows more then three orders of magnitude over enhancement to NAG ($K_b = 75.24 \times 10^2 M^{-1}$).

EXAMPLE 5

This example describes estimation of inhibition concentration ($I_{50}$) for lysozyme imprinted polyvalent copolymers and polyvalent copolymers prepared in the absence of lysozyme by UV spectrophotometric method. *Micrococcus lysodeikticus* is a substrate for the enzyme lysozyme. Relative binding of copolymers was estimated by using a procedure reported by Neuberger and Wilson (1967). 1.5% w/v stock solutions of non imprinted copolymer was prepared in 0.0066 M phosphate buffer pH 6.2 containing 0.0154 M sodium chloride and 0.008 M sodium azide. One milliliter of stock solution containing different copolymer concentration was mixed with 1.6 ml of 78 µg/ml of *Micrococcus lysodeikticus* in a 3-ml capacity glass cuvette. The mixture was incubated for 5 minutes at 20° C. To this mixture 0.1 ml of lysozyme (27 µg/ml) was added and mixed thoroughly. The relative absorbance at 450 nm ($\Delta_{450}$) was recorded for 30 seconds. A blank reading without the copolymer was noted and the change in the absorbance per second was calculated. Then relative inhibition was calculated.

TABLE 4

Relative Inhibition for lysozyme imprinted copolymers of NIP A & poly (acryloyl N-Acetyl Glucosamine)-6-(-N-acryloyl amino) caproate (Macromer) by varying inhibition during synthesis.

| % Inhibition for Imprinting | % Moles NAG by NMR | Iso nM | I max % | I max nM |
|---|---|---|---|---|
| 100 | 30 | $6.00 \times 10^{-2}$ | 96.00 | $3.03 \times 10^{-1}$ |
| 80 | 28 | $1.3 \times 10^{-1}$ | 92.64 | $1.13 \times 10^{-0}$ |
| 60 | 21 | $7.4 \times 10^{-1}$ | 92.00 | $1.66 \times 10^{-0}$ |
| 40 | 24 | $9.6 \times 10^{-1}$ | 88.39 | $2.42 \times 10^{-0}$ |
| 20 | 18 | $1.18 \times 10^{-1}$ | 88.00 | $1.18 \times 10^{-0}$ |

The I 50 value for the polyvalent copolymer comprising 33 mole % NAG was $1.33 \times 10^{-1}$ nM. But a polymer containing 30 mole % NAG prepared using the molecular imprinting technique exhibited the I 50 value $6.00 \times 10^{-2}$ nM.

Thus the polymer prepared using the molecular imprinting technique was more effective in inhibiting lysozyme activity (Table 4).

TABLE 5

Inhibition concentration ($I_{50}$ nM) for the copolymers of NIP A & Ac.6-ACA.PAc.NAG using molecular imprinting technique

| % Inhibition for Imprinting | % Moles of NAG by NMR | 150 oM | Imax | I max nM |
|---|---|---|---|---|
| 100 | 69 | $1.25 \times 10^0$ | 60.00 | $6.94 \times 10^0$ |
| 100 | 62 | $1.20 \times 10^0$ | 66.66 | $3.75 \times 10^0$ |
| 100 | 2.4 | $2.66 \times 10^1$ | 61.00 | $6.66 \times 10^1$ |

TABLE 6

Relative Inhibition ($I_{50}$ nM) of Lysozyme for copolymers of NIP A & Ac.6 ACA.PAc.NAG prepared in absence of lysozyme

| % Moles NAG by NMR | Iso nM | I max | I max nM |
|---|---|---|---|
| NAG | $7.4 \times 10^4$ | 55.29 | $9.2 \times 10^4$ |
| 40 | $1.25 \times 10^{-1}$ | 89.65 | $1.10 \times 10^{-1}$ |
| 36 | $1.17 \times 10^{-1}$ | 88.12 | $8.00 \times 10^{-1}$ |
| 33 | $1.33 \times 10^{-1}$ | 90.00 | $3.30 \times 10^{-1}$ |
| 17 | $3.4 \times 10^{-1}$ | 81.00 | $3.43 \times 10^{-1}$ |

The Advantages of the Present Invention are as Follows:

1. Polyvalent polymers reported here comprise polyvalent ligands prepared by imprinting in the presence of lysozyme and therefore exhibit enhanced interactions.
2. Polyvalent imprinted polymers have appropriate molecular weight and demonstrate greater efficiency in terms of enhanced binding and lower inhibition concentration for lysozyme.
3. The polyvalent imprinted polymers have greater water solubility, stability, and susceptibility to enzyme from hydrolysis.
4. The enhancement in binding due to polyvalent interactions arises from the tailored distribution in the polyvalent imprinted polymers with enzyme receptors.
5. Method of preparation of polyvalent imprinted polymers containing polyvalent NAG is simpler than methods reported in the past since imprinting is carried out at lower temperatures in aqueous medium so that biomolecule retains its activity during imprinting.
6. The polyvalent imprinted polymers containing polyvalent NAG are effective even at low ligand concentration than the polymers synthesized in the absence of a template.
7. The polyvalent imprinted polymers form theromosensitive copolymers and can be used for recovery of the biomolecules.
8. The polyvalent imprinted polymers bind simultaneously to multiple binding sites of biomolecules thereby exhibiting enhanced interactions.

What is claimed is:
1. An imprinted polyvalent polymer of formula (1)

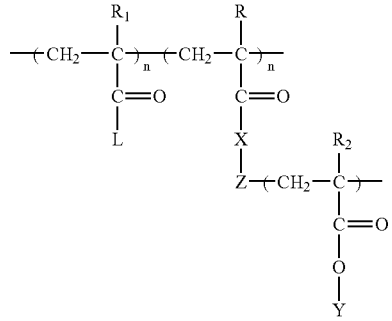

Formula 1 wherein, R is selected from H, $CH_3$, $C_2H_5$ and $C_6H_5$, $R_1$ is selected from H, $CH_3$, $C_2H_5$ and $C_6H_5$; $R_2$ is selected from H, $CH_3$, $C_2H_5$ and $C_6H_5$; X is a residue selected from the group of 4-Amino Butyric Acid (4-ABa), 6-Amino Caproic Acid (6-ACA), 8-Amino Octanoic Acid (8-AOA), 10-Amino Decanoic Acid (10-ADA) and 11-Amino Undecanoic Acid (11-ADA), n is from 3 to 50, L is selected from OH, $NH_2$, $OCH_3$, $NH-CH-(CH_3)_2$, Cl, $OCH_2$, $CH=CH_2$ and $O-CH=CH_2$; Y is selected from N-Acetyl Glucosamine (NAG), mannose, galactose, sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose; Z is a residue of a terminating agent selected from Mercapto Ethanol, Mercapto Propanol, Mercaptoethylamine and HCl.

2. A process for preparation of a polyvalent imprinted polymer of the formula 1

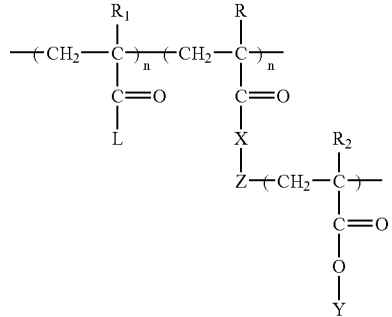

Formula 1 wherein, R is selected from H, $CH_3$, $C_2H_5$ and $C_6H_5$, $R_1$ is selected from H, $CH_3$, $C_2H_5$ and $C_6H_5$; $R_2$ is selected from H, $CH_3$, $C_2H_5$ and $C_6H_5$; X is a residue selected from the group of 4-Amino Butyric Acid (4-ABa), 6-Amino Caproic Acid (6-ACA), 8-Amino Octanoic Acid (8-AOA), 10-Amino Decanoic Acid (10-ADA) and 11-Amino Undecanoic Acid (11-ADA), n is from 3 to 50, L is selected from OH, $NH_2$, $OCH_3$, $NH-CH-(CH_3)_2$, Cl, $OCH_2$, $CH=CH_2$ and $O-CH=CH_2$; Y is selected from N-Acetyl Glucosamine (NAG), mannose, galactose, sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose; Z is a residue of a chain terminating agent selected from Mercapto Ethanol, Mercapto Propanol, Mercaptoethylamine and HCl, said process comprising adding an affinity monomer of formula (2)

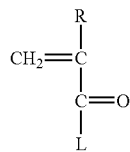

Formula 2 wherein, R is H, CH$_3$, C$_2$H$_5$, CH and L is OH, NH$_2$, OCH$_3$, NH—CH—(CH$_3$)$_2$, Cl, OCH$_2$, CH=CH$_2$, O—CH=CH$_2$ to a solution containing a biomolecule having a molecular weight in the range of 14,000 to 15,000 and containing sites A–F in a solvent, incubating at room temperature to form a complex, dissolving a comonomer of formula (3) in the solution of biomolecules,

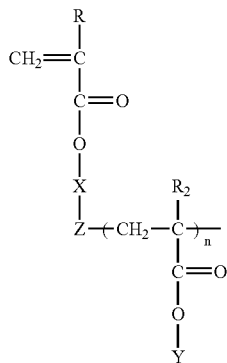

Formula 3 wherein, R is H, CH$_3$, C$_2$H$_5$, C$_6$H$_5$, R$_2$ is H, CH$_3$, C$_2$H$_5$, C$_6$H$_5$, X, IS 4-Amino Butyric Acid (4-ABA), 6-Amino Caproic Acid (6-ACA), 8-Amino Octanoic Acid (8-AOA), 10-Amino Decanoic Acid (10-ADA), 11-Amino Undecanoic Acid (11-ADA), n is from 3 o 500, Z is chain terminating agent such as Mercapto Ethanol, Mercapto Propanol and Mercaptoethylamine HCI; Y is N-Acetyl Glucosamine (NAG), mannose, galatose, sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose, purging the solution with inert gas to obtain inert atmosphere, adding a polymerization initiator and a polymerization accelerator to the solution, heating the solution, separating the unreacted monomers and biomolecules by precipitating the polymer using a non solvent, drying under vacuum at room temperature to obtain the polyvalent imprinted polymer of formula 1.

3. A process as claimed in claim 2 wherein the biomolecule is selected from the group consisting of enzymes, proteins, bacteria and viruses.

4. A process as claimed in claim 3 wherein the bacteria is selected from the group consisting of *E. coli, B. subtilis, S.aurius, micobacterium, sreptococci, pnemonococci.*

5. A process as claimed in claim 3 wherein the virus is selected from the group consisting of rotavirus, shiga, influenza, mumps and HIV.

6. A process as claimed in claim 3 wherein the enzyme is selected from the group consisting of lysozyme, trypsin, chymotrypsin, lipase, esterase, amylase, ovalbumin and bovine serum albumin.

7. A process as claimed in claim 2 wherein the biomolecule is a lectin comprising wheat germ agglutinin (WGA).

8. A process as claimed in claim 2 wherein the solvent is selected from water, Dimethyl formamide, Tetrahydrofuran, isobutanol, methanol, ethanol, ethyl acetate, 1,4 dioxane, and benzene.

9. A process as claimed in claim 2 wherein the ratio of biomolecule to the affinity monomer is in the range of 10:1 to 1:10.

10. A process as claimed in claim 2 wherein the ratio of the biomolecule to the affinity monomer is 1:1 (w/w).

11. A process as claimed in claim 2 wherein the comonomer of formula 3 is selected from the group consisting of acrylic acid, methacrylic acid, methacryloyl chloride, acrylamide, Nisopropyl acrylamide (NIP A), 2-acrylamida-2 methyl propanesulphonic acid (AMPS), acryloyl chloride, acryloyl morpholin, vinyl pyrrolidone, styrene, allyl alcohol and allyl amine.

12. A process as claimed in claim 2 wherein the amount of comonomer of formula 3 in the polymerization mixture is in the range of 5 to 80% by weight of the total feed.

13. A process as claimed in claim 12 wherein the amount of comonomer of formula 3 in the polymerization mixture is in the range of 45 to 55% by weight of the total feed.

14. A process as claimed in claim 2 wherein the polymerization initiator is selected from the group consisting of ammonium persulfate, ceric ammonium sulfate, potassium persulfate, and azobis isobutyro nitrile.

15. A process as claimed in claim 2 wherein the amount of polymerization initiator is in the range of 0.1% to 1% (w/w) of total feed.

16. A process as claimed in claim 2 wherein the accelerator is selected from ethylene diamine and N,N,N,N-tetramethylethylenediamine.

17. A process as claimed in claim 2 wherein the amount of polymerization accelerator is in the range of 1% to 4% by (w/w) of total feed.

18. A process as claimed in claim 2 wherein the non-solvent used for precipitation of polyvalent imprinted polymer is selected from the group consisting of diethyl ether, acetone, hexane and hot water.

19. A process as claimed in claim 2 wherein the heating of the solution is carried out at a temperature in the range of 20°C. to 60°C.

20. A process as claimed in claim 2 wherein the biomolecule is a lysozyme having a molecular weight from 14,000 to 15,000.

21. A process as claimed in claim 2 wherein the affinity monomer is selected from the group consisting of N-Acetyl Glucosamine, sialic acid, galactose, mannose, galactose, sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose.

22. A process as claimed in claim 2 wherein the polyvalent imprinted polymer containing ligand is synthesized by free radical polymerization.

* * * * *